3,563,779
AQUEOUS METALLIC FLAKE COMPOSITIONS
Isao Higaki, Gose-shi, Japan, assignor to Showa Aluminum Powder Co., Ltd., Gose-shi, Nara, Japan
No Drawing. Filed Apr. 1, 1968, Ser. No. 717,990
Claims priority, application Japan, May 9, 1967, 42/28,875
Int. Cl. C09c 1/62
U.S. Cl. 106—290
22 Claims

ABSTRACT OF THE DISCLOSURE

An aqueous metallic flake composition containing an alkanol amide type non-ionic surface active agent.

BACKGROUND OF THE INVENTION

The present invention relates to an aqueous metallic flake composition having a large covering area on water and which has an excellent water dispersibility and coating gloss, and, more particularly, it relates to an aqueous metallic flake composition suitable as a metallic pigment to be added to water-paint compositions.

A metallic pigment for water-paint compositions must have the following three properties:

(1) Good water stability

In general, a metal in the form of finely divided powder is reactive with water. The metallic pigment for water-paint must be water stable since the pigment is strongly reactive with water. In the state of the art metallic pigments for oil paints, water stability is less of a problem since it is difficult for an oily vehicle to react with a metal.

The reaction of metal with water proceeds as follows:

(2) Good water dispersibility

Oily metallic flakes are usually available commercially although aqueous metallic flakes are rarely obtainable. In practice, the metallic flakes for use with paint compositions are mixed with water after converting the flake surface by addition of amines, phosphates and/or surface active agents. However, the conversion of an oily flake to an aqueous flake poses serious dispersibility problems. Scaly metallic flakes which have been completely converted to hydrophilic, can be completely dispersed in a water-paint. However, if the conversion is not complete, the metallic flake disperses in water as a block in which its core is oleophilic and its surface is hydrophillic. Water paint coatings having the metallic flakes in complete dispersion are high in gloss since the scaly particles are uniformly distributed in the coating and arranged in parallel to the coating. In contrast, in incomplete conversion, when the metallic flakes are incompletely dispersed, they tend to form a mass which renders the coating uneven and lusterless. For example, a method for converting an oily flake to an oil-in-water type emulsion by using an oil soluble surface active agent has been disclosed in Japanese patent application publication No. 1,978/61. While this method may be used to make the metallic flake dispersible, it is not entirely satisfactory. Oily flakes can also be made for paint compositions by dispersing a stable aluminum flake powder in water by using an aqueous solution of phosphoric acid and the like as disclosed in Japanese patent application publication No. 5,884/61. However, the flake produced in this manner is poor in dispersibility and the coating is lusterless.

(3) Large covering area on water

The term "covering area on water" means the covering area in the form of a mono-film when one gram of metallic pigment is placed on the surface of water. The larger the covering area on water, the smoother and broader is the coating obtained, and hence the more advantageous.

An aqueous flake obtained from an oily flake by conventional methods is large in covering area on water, but is poor in dispersibility, and tends to coagulate. These metallic flakes are also poor in water stability.

In obtaining an aqueous flake by the conventional grinding method in an aqueous medium, the flake is reactive with water and becomes increasingly unstable as the covering area on water is increased. Flakes having larger covering areas on water therefore cannot be obtained. The present invention is directed to the improvement of water dispersibility of aqueous metallic flakes to the improvement of resistance of metallic flakes to oxidation (the improvement of storage stability) and the improvement of the gloss of the coated surface obtained with water paint compositions containing metallic flakes.

SUMMARY OF THE INVENTION

The present invention relates to an aqueous metallic flake composition containing an alkanol amide type non-ionic surface active agent.

The aqueous metallic flake composition is essentially used as a paint pigment composition.

The alkanol amide type non-ionic surface active agent used in the present invention is represented by the formula:

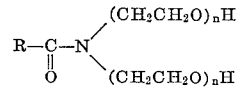

wherein R represents an alkyl group or an alkenyl group having 11 to 17 carbon atoms, and $n$ is a number of one or greater depending on the water solubility of the compound.

DETAILED DESCRIPTION OF THE PREFERRED EMBODIMENTS

The compounds represented by the above-described formula include, for example, alkanol amides synthesized from diethanolamine and a fatty acid obtained from coconut oil, lauric acid, oleic acid, stearic acid and palmitic acid.

Examples of the metallic flake to which the present invention is applied include aluminum metal, copper metal, zinc metal, brass and other metals and alloys having good malleability. The preferred result can be obtained with aluminum or brass. The compositions of the present invention can be prepared from either an aqueous metallic flake or an oily metallic flake.

The method of obtaining the composition from an aqueous metallic flake comprises adding an alkanol amide to the aqueous metallic flake while grinding the metal into the form of a flake, or after grinding. The amount used may range from about 1.5 to 10% by weight, preferably from 3 to 6% by weight, based on the weight of the metallic flake. The flake is then washed with a large amount of water and separated from the water. The metallic flake paste thus obtained is further polished, filtered and stored as the metallic flake paste of the product, or is mixed with an aqueous vehicle to be used for a paint.

In another method, after being ground, the metallic flake is separated from the water without addition of alkanol amide and polished. During polishing, about 1.5 to 10% by weight, preferably 3 to 6% by weight, of alkanol amide based on the flake is added. The combination is then filtered to form a paste product.

An aqueous metallic flake can be obtained from an oily metallic flake by addition of 1.5 to 10%, by weight, preferably 3 to 6% by weight, of an alkanol amide type non-ionic surface active agent, based on the metallic flake, with or without other surface active agents, and polishing with an appropriate amount of water.

Greater or lesser amounts of alkanol amide may be added to the metallic flake. However, if less than 1.5% by weight is used, the effect is not sufficient. Even if greater than 10% by weight is used, the effect for increasing the amount is not obtained. It is surprising that when the product metallic flake contains the amount of alkanol amide disclosed, the water dispersibility, the resistance of metallic flake to oxidation (the storage stability) and the coating gloss are all improved.

The reason for these effects of alkanol amide is not completely understood. It is believed, however, that it is somehow related to the affinity of the amide group to the metal and the adsorption of the alkanol amide on the metal surface.

The good water dispersibility and storability of the aqueous metallic flake can also be obtained by adding amide without polishing. In any case, preferred properties are obtained when the alkanol amide is absorbed by the metallic flake.

The quality of the aqueous metallic flake composition obtained in the present invention is improved by using alkanol amide in combination with morpholine.

The cause is not clear, but the improvement is considered to be caused by the synergistic action of morpholine with alkanol amide, because morpholine itself is anti-corrosive with metal and water soluble. The amount of morpholine used is suitably 0.5 to 5% by weight, based on the metal. Greater or less amounts can be used, but if less than 0.5% by weight is used, the effect is insufficient. If greater amounts than 5% by weight are used, the effects are not increased. Morpholine may be added to the metal during any step of grinding, polishing or storage, and may be added on or before the addition of the alkanol amide.

For a more complete understanding of the invention, reference is made to the following examples which are presented here for illustration only and are not intended to be limiting in any manner.

Example 1

7000 g. of the metallic flake in the form of cake (leafing type, metal content 80%, covering area on water 15,500 cm.$^2$/g.) obtained on preparing an oily aluminum paste was adjusted so that its metal content was 40% with 280 g. of alkanol amide synthesized from a fatty acid obtained from coconut oil and diethanol amide and, 224 g. of morpholine and water were added. The flakes were polished for 11 hours. The aluminum flake thus obtained showed excellent storage stability in the presence of water, and the film obtained by coating a suspension of the aluminum flake in water having a 15% metal content, after being storage for 6 months, by using vinyl acetate latex, had a 45% surface gloss as measured at a 60° angle according to ASTM D523–53T. Degradation was not detectable even after storage for six months, while those films obtained by the methods according to Japanese patent application publication Nos. 1,978/61 and 5,884/61 degraded 22% and 28% in reflection, respectively.

Example 2

The aqueous medium consisting of the following components:

| | Percent by weight |
|---|---|
| Morpholine | 3.1 |
| Oleic acid | 4.0 |
| Isopropyl alcohol | 10.0 |
| Solvent naphtha | 5.0 |
| Water | Balance | was placed in a ball mill with the same weight of aluminum foil scraps, and, after grinding at the ordinary temperature for eight hours, 6.0%, based on the weight of aluminum, of alkanol amide synthesized from lauric acid, and diethanol amine was added thereto, and further ground for three hours. The aqueous aluminum flake obtained after washing and filtering had a 15,500 cm.$^2$/g. covering area on water, and was not degraded in the form of paste containing a 60% metal content for more than one year and a half. Coating surface reflectivity was 75%.

In contrast, the aqueous aluminum flake prepared by grinding under the same condition for 11 hours, except that alkanol amide was not added, was 15,800 cm.$^2$/g. in covering area on water, and 60% in coating gloss. After storage for one year and a half, the coating was degraded to 25% reflectivity.

Example 3

180 g. of alkanol amide synthesized from oleic acid and diethanol amine and 4,000 g. of water were added to 6,000 g. of brass flake (coated by stearic acid, covering area on water 3,500 cm.$^2$/g.) commercially available at market to form a slurry which was then polished for eight hours.

The aqueous brass flake thus obtained was excellent in coating and after storage for six months its dispersibility and coating gloss were not degraded.

Example 4

300 g. of alkanol amide synthesized from stearic acid and diethanol amine and 1,700 g. of water were added to 3,000 g. of aluminum powder in the form of flake (coated by stearic acid, covering area on water 7,800 cm.$^2$/g.) commercially available at market and were mixed in a mixer for one hour.

The aqueous flage thus obtained could be storage in the form of a paste containing 60% of metal content for 4 to 5 months and was 40% in reflectivity or coating surface.

Example 5

105 g. of alkanol amide synthesized from palmitic acid and diethanol amine, 140 g. of morpholine, and water were added to 7,000 g. of zinc flake (coated by stearic acid, covering area on water 2,800 cm.$^2$/g.) commercially available at market to make the metal content 40%, and were polished for eight hours.

The aqueous zinc flake thus obtained was not degraded during storage for 2 to 3 months.

What is claimed is:

1. An aqueous metallic flake composition containing metallic flake, and from 1.5 to 10%, by weight based on the amount of metallic flake, of an alkanol amide type non-ionic surface active agent represented by the formula:

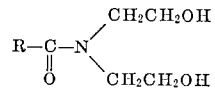

wherein R represents a group selected from the class consisting of alkyl and alkenyl groups having from 11 to 17 carbon atoms.

2. The composition of claim 1, wherein said alkanol amide type non-ionic surface active agent is synthesized from diethanol amine and a fatty acid selected from the group consisting of a fatty acid obtained from coconut oil, lauric acid, oleic acid, stearic acid and palmitic acid.

3. The composition of claim 1, wherein said metal is selected from the group consisting of aluminium, brass and zinc.

4. An aqueous metallic flake composition containing metallic flake and from 1.5 to 10% by weight, based on the amount of metallic flake, of an alkanol amide type non-ionic surface active agent represented by the formula:

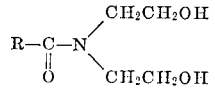

wherein R represents a group selected from the class consisting of alkyl and alkylene groups having from 11 to 17 carbon atoms, and from 0.5 to 5% morpholine, based on the weight of metallic flake.

5. The composition of claim 4, wherein said alkanol amide type non-ionic surface active agent is synthesized from diethanol amine and a fatty acid selected from the group consisting of a fatty acid obtained from coconut oil, lauric acid, oleic acid, stearic acid and palmitic acid.

6. The composition of claim 4, wherein said metal is selected from the group consisting of aluminum, brass and zinc.

7. The composition of claim 1 wherein said metallic flake comprises aluminum.

8. The composition of claim 1 wherein said metallic flake comprises brass.

9. The composition of claim 4 wherein said metallic flake comprises aluminum.

10. The composition of claim 4 wherein said metallic flake comprises brass.

11. In a process for preparing an aqueous metallic flake composition by grinding the metal in water, the improvement which comprises conducting said grinding in the presence of from 1.5 to 10% by weight, based on the amount of metallic flake, of a soluble alkanol amide type non-ionic surface active agent represented by the formula:

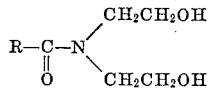

wherein R represents a group selected from a class consisting of alkyl and alkenyl groups having from 11 to 17 carbon atoms.

12. The process of claim 11 further comprising washing said metallic flake, after grinding, with water and separating said metallic flake from water.

13. The process of claim 11 wherein said alkanol amide type non-ionic surface active agent is synthesized from diethanol amine and a fatty acid selected from the group consisting of a fatty acid obtained from coconut oil, lauric acid, oleic acid, stearic acid and palmitic acid.

14. The process of claim 11 wherein said metal is selected from the group consisting of aluminum, brass and zinc.

15. In the method of preparing an aqueous metallic flake composition by grinding the metal in water, the improvement which comprises conducting said grinding in the presence of from 1.5 to 10%, based on the weight of metallic flake, of a soluble alkanol amide type non-ionic surface active agent represented by the formula:

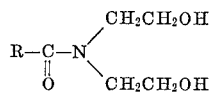

wherein R represents a group selected from the class consisting of alkyl and alkenyl groups having from 11 to 17 carbon atoms, and from 0.5 to 5% by weight, based on the weight of metallic flake, of morpholine.

16. The process of claim 15 further comprising washing said metallic flake, after grinding, with water and separating said metallic flake from water.

17. The method of claim 15 wherein said alkanol amide type non-ionic surface active agent is synthesized from diethanol amine and a fatty acid selected from the group consisting of a fatty acid obtained from coconut oil, lauric acid, oleic acid, stearic acid and palmitic acid.

18. The method of claim 15 wherein said metal is selected from the group consisting of aluminum, brass and zinc.

19. The composition of claim 1 containing from 40 to 60% of said metallic flake.

20. The composition of claim 4 containing from 40 to 60% of said metalic flake.

21. The process of claim 12 using from 40 to 60% of said metallic flake.

22. The method of claim 16 using from 40 to 60% of said metallic flake.

References Cited
UNITED STATES PATENTS

| | | | |
|---|---|---|---|
| 2,522,538 | 9/1950 | Rethwisch et al. | 106—290 |
| 2,525,280 | 10/1950 | Allen | 106—290 |
| 2,587,267 | 2/1952 | Wray et al. | 106—290 |

JAMES E. POER, Primary Examiner

U.S. Cl. X.R.

106—291